April 29, 1947.   G. P. LUCKEY   2,419,687

METHOD OF OLIVING JEWELS

Filed Nov. 24, 1945

*INVENTOR.*
GEORGE P. LUCKEY
BY *Murray W. Gould*
ATTY.

Patented Apr. 29, 1947

2,419,687

UNITED STATES PATENT OFFICE 2,419,687

METHOD OF OLIVING JEWELS

George Paul Luckey, Lancaster, Pa., assignor to Hamilton Watch Company, Lancaster, Pa.

Application November 24, 1945, Serial No. 630,599

4 Claims. (Cl. 51—282)

This invention relates to jewels used in watches or scientific instruments as bearings, wire drawing dies, etc., and more particularly to a method of enlarging or oliving the hole.

The term "oliving" is used here and throughout the specification to denote the process for producing a specified shape on the interior wall of the hole of a jewel where the staff journal in the hole has line contact with the bearing.

The object of the invention is to provide a new method by which the interior wall of the hole in a jewel bearing is contoured to an olive shape or enlarged as desired.

A further object of the invention is to provide a method of oliving or enlarging holes in jewel bearings in groups.

A still further object of the present invention is to provide a method which is automatic in character and which when once started in operation need only to be timed for the operator to know the operation is completed.

A still further object of the present invention is to provide a method of oliving or enlarging the holes of a multiplicity of jewel bearings simultaneously, and to produce jewel bearings having identical holes therethrough.

The invention shown in the accompanying drawing in which Figure 1 is a diagrammatic view of an apparatus which may be used to carry out the proposed method.

Fig. 2 is a top plan of the holder for a multiplicity of jewel bearings.

Fig. 3 is a cross-section on line 3—3 of Fig. 2.

Fig. 4 is a cross-section of a jewel bearing diagrammatically showing the direction of flow of the abrading material.

Fig. 5 is a cross-section similar to Fig. 4 showing the jewel with one edge completely finished.

Fig. 6 shows the cross-section of a jewel with the abrading material in a reverse flow.

Fig. 7 is a cross-section of the completed jewel showing the olive formation of the interior wall of the jewel hole.

Figure 1:
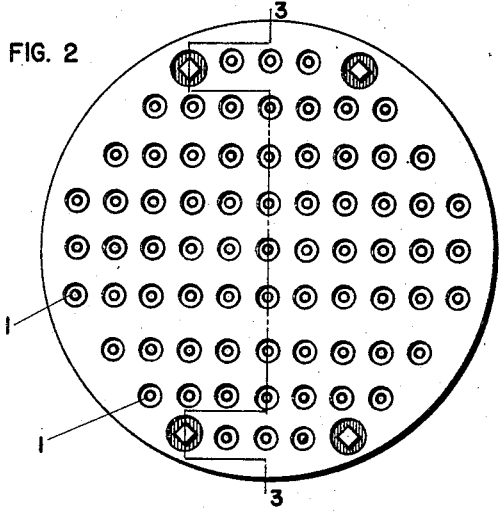
Figure 1:
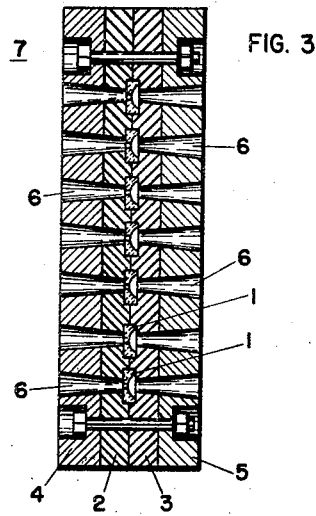
Figure 1:
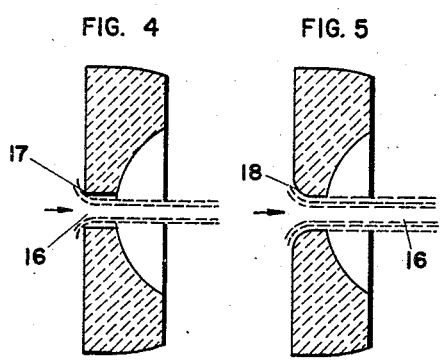
Figure 1:
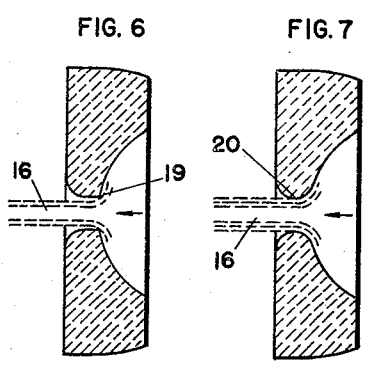
Figure 1:
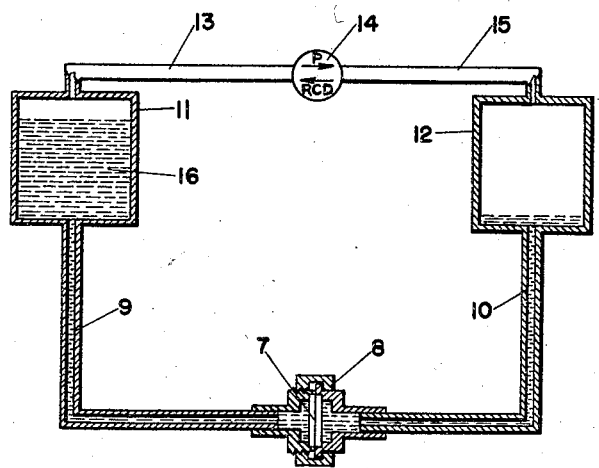

Referring to the drawing, particularly Figures 2 and 3, the jewels 1 are mounted in recesses formed in the plates 2 and 3, respectively. These plates are preferably formed of lead to provide a sealing connection between them when bolted together for the abrading operation. Steel backing plates 4 and 5 are secured to the lead faces to provide strength so that the plates may be tightly bolted together. Each of the plates 2 and 4 and 3 and 5 are formed with funnel shaped openings 6 leading to the jewels 1 which are housed in their respective recesses. This plate which may be considered as the unit 7 may be designed to hold any number of jewels, and is secured centrally of the coupling member 8 connecting the pipe lines 9 and 10.

The method to which this application is directed may be carried out by an apparatus shown in Figure 1 where a tank 11 is connected to a tank 12 through pipe 9, coupling 8, and pipe 10 to permit an abrasive-fluid flow between said tanks. They are also connected by a pipe 13, a reversible constant delivery pump 14, and a pipe 15 to supply compressed air or other suitable medium alternatively to either tank. The liquid 16 shown in the tanks is liquid mixed with an abrading material, preferably diamond dust, and is forced back and forth through the jewels held in the holder 7 to abrade the inner surface of the hole of jewel bearings to either enlarge or to produce an olive shape.

Referring to Figures 4, 5, 6, and 7, the abrading material passing in the direction as shown in Figure 4 will wear against the edge 17 until it is worn as shown in Figure 5 at 18. The reversal of the flow of the fluid 16 will wear the opposite edge 19 until the finished jewel has the contour as shown in Figure 7 at 20. Further operation of the method will enlarge the opening in the jewel to any desired size.

The method herein described is a simple method for enlarging the holes of jeweled bearings and provides means for performing an operation heretofor done by hand by machinery. This method may be carried out in any desired way and with any apparatus, the method being in no way limited by the apparatus herein described.

What is claimed is:

1. A method of enlarging the holes of jewel bearings consisting in forcing a fluid containing abrasive material through said holes in one direction for a predetermined period of time, reversing the direction of flow of said fluid for a like period of time.

2. A method of enlarging the holes of a multiplicity of jewel bearings consisting in grouping said bearings in a single plane forcing a stream of fluid containing abrasive material through holes of said jewel bearings in one direction for a predetermined period of time, and reversing the flow of said fluid and abrasive for a like period of time.

3. A method of abrading the inner wall of the hole in jewel bearings consisting in forcing a liquid containing abrasive material at high velocity through said hole in one direction for a predetermined period of time, and reversing the direction of said liquid flow for a like period of time to wear away the edges of said hole and provide an olive shaped opening in said jewel bearing.

4. A method of oliving the interior wall of the hole of jewel bearings consisting in supporting said bearings rigidly forcing a fluid containing diamond dust through said jewel bearing holes in one direction and at high velocity for a predetermined period of time, reversing the flow of said abrading liquid for a like period of time and maintaining said reversel of flow until the desired inner diameter is reached.

GEORGE PAUL LUCKEY.

REFERENCES CITED

The following references are of record in the file of this patent:

UNITED STATES PATENTS

| Number | Name | Date |
|---|---|---|
| 1,890,164 | Rosenberger | Dec. 6, 1932 |
| 1,923,635 | McCrery | Aug. 22, 1933 |

FOREIGN PATENTS

| Number | Country | Date |
|---|---|---|
| 392,826 | British | May 25, 1933 |